(12) United States Patent
Carothers et al.

(10) Patent No.: US 9,121,212 B2
(45) Date of Patent: Sep. 1, 2015

(54) RELEASABLE HOOD HINGE WITH POSITIVE RESET

(71) Applicant: Dura Operating LLC, Auburn Hills, MI (US)

(72) Inventors: David Gordon Carothers, Guelph-Eramosa (CA); Robert A. Hendren, Macomb, MI (US); Dean B. Watson, Oakland Township, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 14/203,677

(22) Filed: Mar. 11, 2014

(65) Prior Publication Data

US 2014/0259531 A1    Sep. 18, 2014

Related U.S. Application Data

(60) Provisional application No. 61/799,087, filed on Mar. 15, 2013.

(51) Int. Cl.
| | |
|---|---|
| *E05D 3/18* | (2006.01) |
| *E05F 3/20* | (2006.01) |
| *E05D 3/12* | (2006.01) |
| *B60R 21/38* | (2011.01) |
| *B60R 21/34* | (2011.01) |

(52) U.S. Cl.
CPC . *E05F 3/20* (2013.01); *B60R 21/34* (2013.01); *B60R 21/38* (2013.01); *E05D 3/125* (2013.01); *E05D 3/18* (2013.01); *B60R 2021/343* (2013.01); *E05Y 2900/536* (2013.01); *Y10T 16/521* (2015.01); *Y10T 16/54023* (2015.01)

(58) Field of Classification Search
CPC .. B60R 21/34; B60R 21/38; B60R 2021/343; E05D 3/125; E05D 3/18; E05Y 2900/536; Y10T 16/521

See application file for complete search history.

(56) References Cited

U.S. PATENT DOCUMENTS

| | | | | |
|---|---|---|---|---|
| 5,718,019 | A * | 2/1998 | Cheal | 16/388 |
| 6,513,617 | B2 * | 2/2003 | Sasaki et al. | 180/274 |
| 6,543,086 | B2 * | 4/2003 | Bjureblad et al. | 16/222 |
| 7,934,293 | B2 * | 5/2011 | Kalargeros | 16/369 |
| 8,069,943 | B2 | 12/2011 | Takahashi | |
| 8,544,590 | B2 * | 10/2013 | McIntyre | 180/274 |
| 8,893,354 | B2 * | 11/2014 | McIntyre et al. | 16/343 |
| 8,939,249 | B2 * | 1/2015 | Kuhr et al. | 180/274 |
| 2002/0014367 | A1 * | 2/2002 | Sasaki et al. | 180/274 |

(Continued)

FOREIGN PATENT DOCUMENTS

DE       102007033325 A1     1/2008

OTHER PUBLICATIONS

Extended European Search Report for EP Application No. 14159655.1 (7 pages).

*Primary Examiner* — Jeffrey O Brien
(74) *Attorney, Agent, or Firm* — Reising Ethington P.C.; Matthew J. Schmidt; Robert E. Ford

(57) ABSTRACT

A releasable hood hinge assembly having a reset member, a return block, an overjump and a landing offset from the return block, the return block having a positive stop, wherein the reset member is idle in the pre-crash condition, engages the landing in the post-crash condition and is blocked by the positive stop from returning to the pre-crash condition in the post-crash operating condition.

12 Claims, 5 Drawing Sheets

(56) References Cited

U.S. PATENT DOCUMENTS

| | | | |
|---|---|---|---|
| 2002/0026685 A1* | 3/2002 | Bjureblad et al. | 16/221 |
| 2005/0279550 A1* | 12/2005 | Saville et al. | 180/69.21 |
| 2005/0283948 A1* | 12/2005 | Hyde | 16/361 |
| 2008/0174124 A1* | 7/2008 | Takahashi et al. | 292/45 |
| 2008/0189015 A1 | 8/2008 | Borg et al. | |
| 2008/0302591 A1* | 12/2008 | Herzog et al. | 180/274 |
| 2009/0288271 A1* | 11/2009 | Kmieciak et al. | 16/308 |
| 2009/0289473 A1* | 11/2009 | Kmieciak | 296/193.11 |
| 2010/0101048 A1* | 4/2010 | Thomas | 16/223 |
| 2013/0025958 A1 | 1/2013 | Mcintyre | |
| 2013/0074284 A1* | 3/2013 | Kuhr et al. | 16/222 |
| 2014/0182962 A1* | 7/2014 | McIntyre et al. | 180/274 |

* cited by examiner

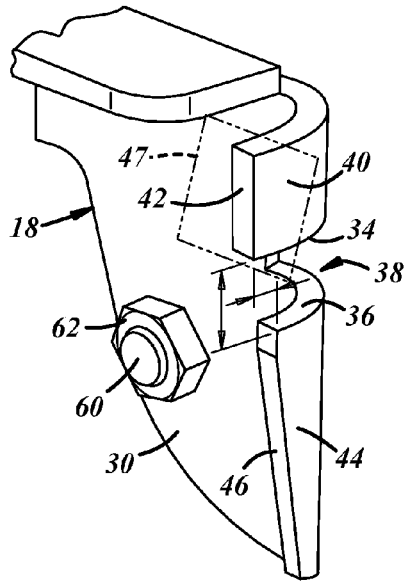
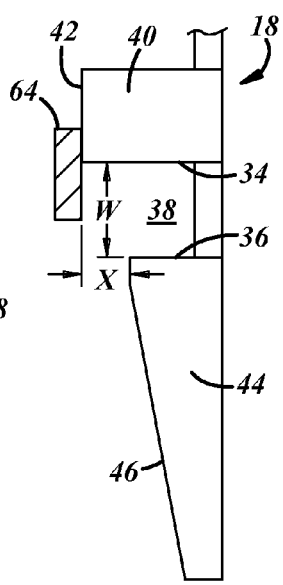
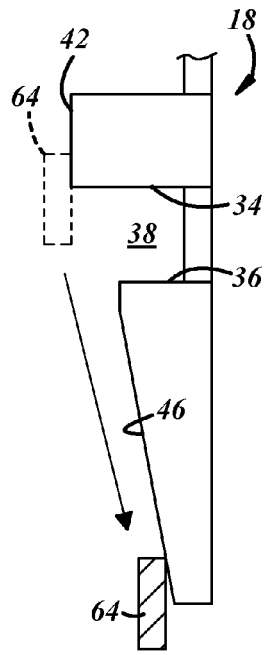
*FIG. 6*     *FIG. 7*     *FIG. 8*
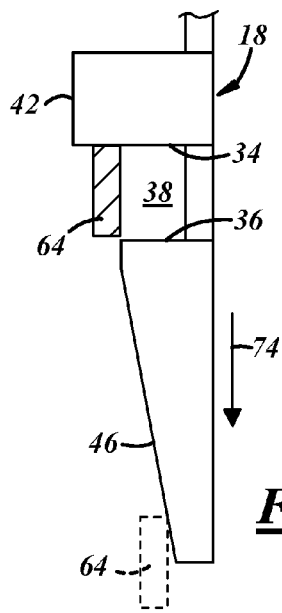
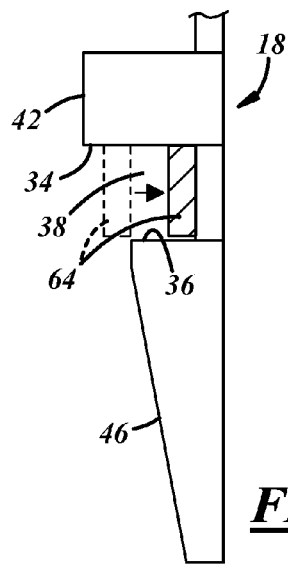
*FIG. 9*     *FIG. 10*

RELEASABLE HOOD HINGE WITH POSITIVE RESET

REFERENCE TO COPENDING APPLICATIONS

This application claims the benefit of U.S. Provisional Patent Application Ser. No. 61/799,087 filed Mar. 15, 2013, which is incorporated herein by reference in its entirety.

TECHNICAL FIELD

The present disclosure relates to a releasable hood hinge assembly with positive reset.

BACKGROUND

Hood hinges interconnect a vehicle hood with the vehicle frame or body. The hood may be opened to permit access to any component (e.g. an engine or storage compartment) and may be secured in a closed position during vehicle operation.

Releasable hood hinge mechanisms that permit some movement of a vehicle hood relative to the body are known. Such devices may raise a portion of the vehicle hood during a vehicle collision, however deployment of previously known hood hinge mechanisms have been unreliable as the release and reset mechanisms becoming undesirably engaged with adjacent components preventing the intended hood deployment or resetting of the hood. Accordingly, a hood hinge release mechanism is desired that can be more reliably deployed and reset under certain loads and conditions.

SUMMARY

A releasable hood hinge assembly includes a first link adapted to be connected to a vehicle hood, a second link having a first pivot about which the second link pivots in use, a releasable connector coupling the first and second links together, a return block and a reset member selectively engageable with the return block. The releasable connector has a connected state in which it connects together the first and second links and defines a design position of the hinge assembly, and a released state wherein relative movement is permitted between the first and second links to a deployed position and a reset position of the hinge assembly. The reset member has a portion that is selectively engageable with the return block so that the reset member engages the return block when the hinge assembly is in its reset position. When the reset member is engaged with the return block, movement of the first link relative to the second link is inhibited. A stop surface generally opposed to the return block may be provided, and in the reset position, the reset member may be overlapped in the direction of motion of the first link by both the return block and the stop surface to retain the hinge assembly in its reset position.

In at least some implementations, the reset member may be a cantilevered body that is flexible and resilient. The reset member may be bent within its elastic limit at least when the hinge assembly is near but not within its reset position, and the reset member may resiliently return toward its unbent state when the hinge assembly is in its reset position to positively retain the reset member engaged with the return block. The resilient return of the reset member toward its unbent state may happen automatically as the first link moves relative to the second link to a position where the reset member is aligned with the return block.

In at least some implementations, a link control assembly includes a return block, a stop surface and a overjump between return block and the stop surface. The return block and stop surface may be generally oppositely facing or confronting surfaces on opposed sides of the overjump. The return block may extend laterally outwardly further than the stop surface so that the reset member engages the return block when the first link moves from a deployed hinge position to the reset position. In the reset position, the reset member is aligned with the overjump and may enter the overjump due to the resilient return of the reset member toward its unbent or unflexed state.

The first link, second link, reset member and return block may be constructed and arranged so that the reset member does not engage or remain engaged with the return block when the hinge assembly moves from its normal or design position to its deployed position. And these components may be designed so that the reset member positively engages the return block when the hinge assembly is moved from its deployed position to its reset position.

In at least some implementations, a retaining surface and a landing may be provided on opposite sides of the overjump. The retaining surface may engage the reset member in the design position of the hinge assembly, and the landing may be offset in two directions from the retaining surface. One direction offset may be in the direction of travel of the first link relative to the second link and the other direction of offset may be in a direction other than the direction of travel. The landing may be engaged by the reset member as the hinge assembly is moved from its deployed position to its reset position, and the landing may flex the reset member before the reset member is registered with the overjump.

A releasable hood hinge assembly may have a reset member, a return block, an overjump and a landing offset from the return block. The return block may have a positive stop, wherein the reset member is idle in a pre-crash condition, engages the landing in a post-crash condition and engages the positive stop in a post-crash operating condition.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which:

FIG. 6 is an enlarged fragmentary perspective view showing a portion of a first link including a catch;

FIG. 7 is a somewhat diagrammatic end view of the first link and reset member when the hinge assembly is in its design position;

FIG. 8 is a somewhat diagrammatic end view of the first link and reset member when the hinge assembly is in its deployed position;

FIG. 9 is a somewhat diagrammatic end view of the first link and reset member when the hinge assembly is moved from its deployed position toward its reset position;

FIG. 10 is a somewhat diagrammatic end view of the first link and reset member when the hinge assembly is in its reset position;

DETAILED DESCRIPTION OF PREFERRED EMBODIMENTS

Figure 1:
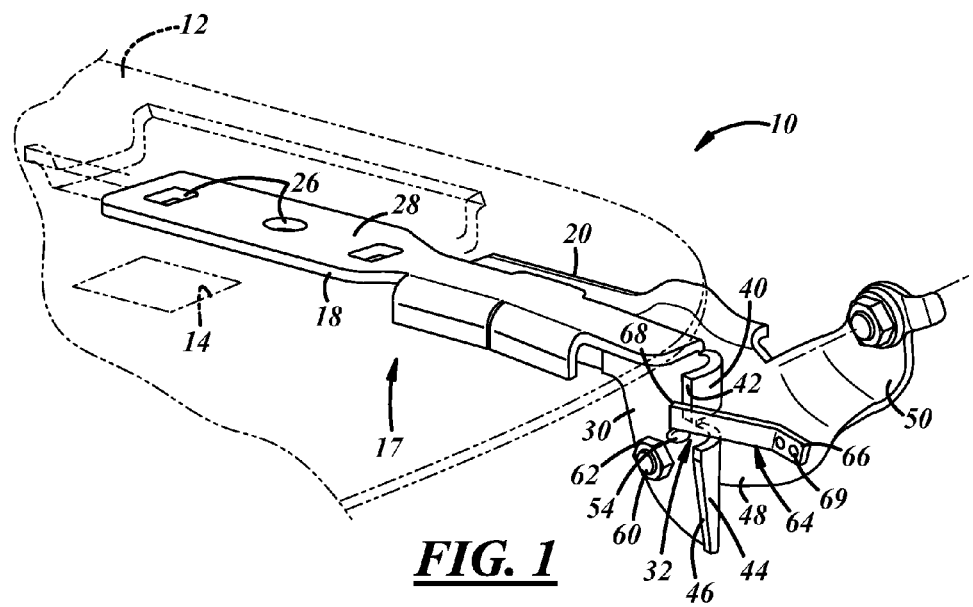
FIG. 1 is a fragmentary perspective view showing a hood hinge assembly in its design position and a portion of a hood connected thereto.
Figure 2:
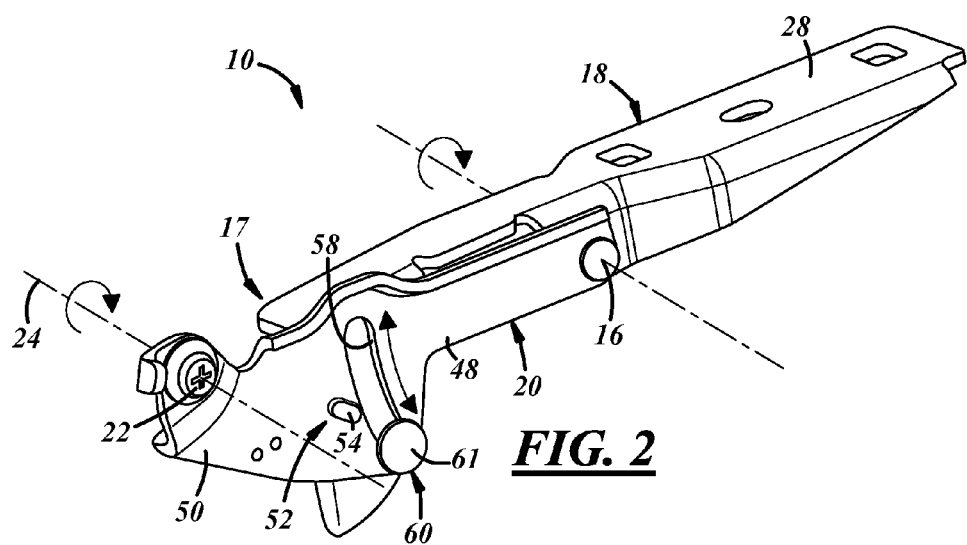
FIG. 2 fragmentary is a perspective view of an outside of the hood hinge assembly in its design position.
Figure 3:
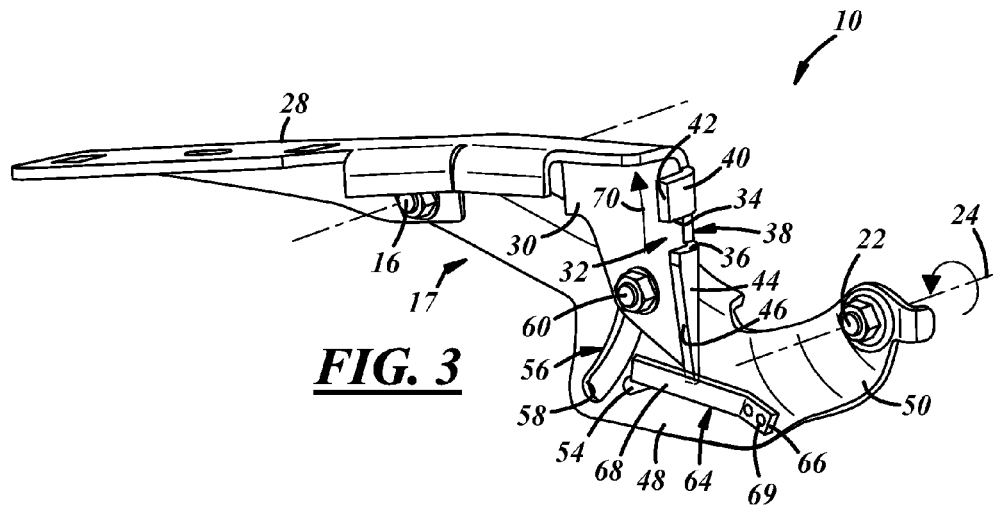
FIG. 3 is a fragmentary perspective view of an inside of the hood hinge assembly in its deployed position.

Referring in more detail to the drawings, FIGS. 1-3 illustrate a releasable hood hinge assembly 10 that interconnects a vehicle hood 12 to a vehicle body and controls movement of the hood relative to the body. The hood hinge assembly 10 may be used in conjunction with an actuator 14 that pivots the hood 12 about a secondary pivot point 16 (FIG. 2) to move the hood 12 relative to the body during at least certain circumstances. One such circumstance could be an anticipated collision as determined by one or more vehicle sensors. For example, it may be desirable to raise at least a portion of the hood 12 away from its primary support immediately before or during the initial moments of a vehicle collision at or near the front of the vehicle. This permits the hood 12 to move during an impact with, for example, a pedestrian which may improve energy absorption and dissipation by the hood 12.

The hinge assembly 10 may include a hood link 17 coupled to and supporting one side of a vehicle hood 12. Two such hood links 17 may be provided, with one attached to each of the opposed sides of the hood 12. The hood links 17 may be mirror images of each other, so only one will be described in detail. The hood link 17 is also adapted to be coupled at a primary pivot point 22 to a second link (not shown) that is connected to the vehicle body. In normal raising and lowering movement of the hood 12, the hood 12 may pivot about an axis 24 of the pivot point 22 which defines a primary axis of movement for the hood 12. The hood link 17 and second link may be of any desired shape, size, strength and the like, suitable for use with a vehicle hood and as set forth herein.

The hood link 17 may include a first link 18 and a second link 20 pivotably connected to the first link 18 at the secondary pivot 16. As will be described in more detail later, the first link 18 and second link 20 are releasably coupled together so that, in normal operation, these links do not move relative to one another and instead move as a unitary structure as the hood is raised and lowered about the primary pivot 22. When the connection between the first link 18 and second link 20 is released, the first link 18 may pivot relative to the second link 20 about the secondary pivot 16.

The first link 18 may include one or more mounting features 26 that permit attachment of the hood 12 to the first link 18. In at least one implementation, the first link 18 may be attached adjacent to a rear portion of the hood 12, closer to a vehicle windshield than a front of the vehicle. The mounting feature 26 may be provided in an upper wall 28 of the first link 18 that may span the length of the first link to improve support of the hood 12, as desired. The first link 18 may also include a sidewall 30 depending from the upper wall 28 at an angle, shown as a right angle in the implementation of FIGS. 1-3.

The second hood link 20 may have a sidewall 48 oriented generally parallel and adjacent to the sidewall 30 of the first hood link 18, and a mounting flange 50 extending from the sidewall 48 and connected to or including the pivot 22 about which the first and second links 18, 20 rotate or pivot in normal operation of the hood 12. The second link 20 may be of any component or combination of components suitable for interconnecting the first link 18 to the pivot 22, and for participating in securing the hood 12 in its normal driving position as well as allowing raising and lowering of the hood such as to permit access to a vehicle compartment, such as an engine compartment.

A releasable connector 52 may be at least partially carried by one or both of the first and second links 18, 20 to releasably couple them together. The releasable connector 52 may be any suitable component or combination of components that has a connected state wherein it couples together the first link 18 and second link 20 during normal operation of the hood 12, and a released or unlocked state wherein relative movement between the links 18, 20 is permitted under at least certain conditions. In one implementation, the releasable connector 52 includes a shear pin 54 that is fixed to sidewall 30 of the first link 18 and the sidewall 48 of the second link 20. The pin 54 may be rigid and in one piece in its connected state to prevent relative movement between the links 18, 20 during normal operation and movement of the hood 12. The pin 54 may shear or break when acted upon by a force above a threshold to define the released state and permit movement of the first link 18 relative to the second link 20.

The first and second links 18, 20 may also be coupled together by the secondary pivot 16. The secondary pivot 16 may include a rivet, shaft or other connector that permits pivoted movement of the first link 18 relative to the second link 20 when the releasable connector 52 has been released. Thus, when the releasable connector 54 has been released, the first link 18 may pivot relative to the second link 20 about the secondary pivot 16. The secondary pivot 16 may be spaced from the primary pivot 22 and provided closer to a front end of the first link 18 than the primary pivot 22 is (where front end refers to the end closer to a front end of the vehicle, and further from a windshield of the vehicle). In one implementation, the secondary pivot 16 is provided between a front and rear end of the first link 18.

The first and second links 18, 20 may further be coupled together by a movable coupling 56. The movable coupling 56 provides a second point of connection between the links 18, 20 after the releasable connector 52 has been released. This provides a more controlled pivoting of the first link 18 relative to the second link 20 and may also limit the maximum movement of the first link relative to the second link. In the implementation shown, the movable coupling 56 includes a slot 58 or track formed in one link and a connector 60 carried by the other link and received in the slot 58 for movement within the slot. The connector 60 may be a rivet with a shaft received in the slot 58 and an enlarged head 61 that overlaps a portion of the second link 20 outside of the slot 58 and a second head 62 that overlaps a portion of the first link 18 to retain the connector 60 within the slot (instead of a rivet, the connector may include a bolt and nut, or some other component). As the first link 18 pivots relative to the second link 20, the connector 60 moves within the slot 58. Maximum movement of the first link 18 relative to the second link 20 is thereby controlled by the amount of movement of the connector 60 that is permitted.

As is known in the art, an actuator 14 may be operably associated with the first link 18. In at least certain conditions, the actuator 14 provides a force on the first link 18 that releases the releasable connector 52 (e.g. breaks the shear pin 54 in this implementation) and pivots the first link 18 relative to the second link 20. The hinge assembly 10, and also the hood 12 which is fixed to the first link, thus pivots from a normal design position (FIGS. 1 and 2) to a deployed position (FIG. 3). In at least some implementations, a rear end of the hood 12 (closest to the windshield) is pivoted upwardly in the deployed position as compared to the normal design position in which the hood remains during normal operation of the vehicle. At least one instance when the actuator 14 may be actuated to move the hood 12 to the deployed position is upon sensing a vehicle frontal collision or upon sensing at least one condition indicative of an imminent vehicle collision. Accordingly, during or prior to a vehicle collision, the actuator 14 may cause the hood 12 to move to its deployed position.

Figure 4:
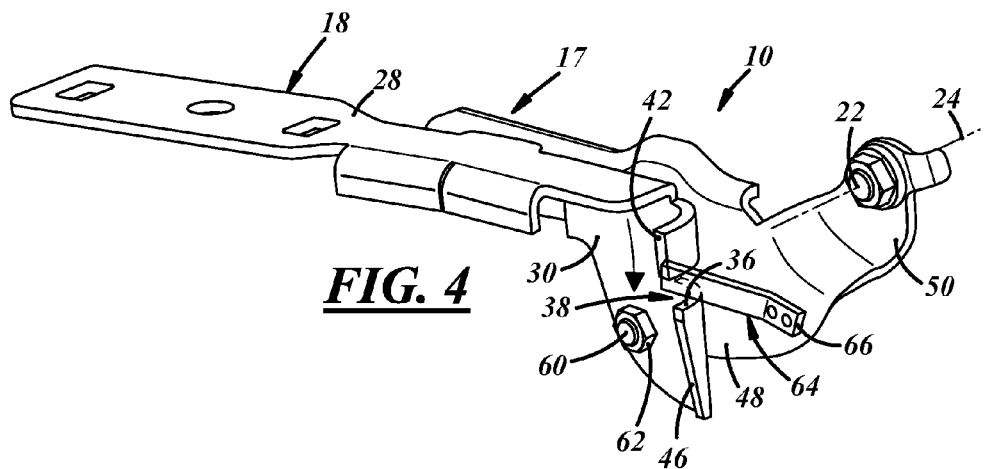
FIG. 4 is a fragmentary perspective view of an inside of the hood hinge assembly in its reset position.

After the hood 12 is moved to its deployed position, it may be desirable to return the hood and the hinge assembly 10 toward the normal design position to permit subsequent vehicle operation. However, it might not be desirable to permit the hood 12 to return all the way to its normal design position because the hood may be deformed/damaged and/or certain vehicle components beneath the hood may have been moved during a collision and fully closing the hood back to its normal design position may cause the hood to impinge on such components (e.g. belts, tubes and the like). Therefore, a reset position of the hinge assembly 10 (and hood) may be defined between the normal design position and the deployed position, as shown in FIG. 4. After the hinge assembly 10 has been moved to its deployed position, the hinge assembly 10 may then be moved to the intermediate, reset position as set forth below.

To control movement of the hinge assembly 10 and hood 12 to the reset position, a link control assembly 32 may be provided. In at least some implementations, the link control assembly 32 may include all or a combination of some of a retaining surface 42, a return block 34, an overjump 38, a stop surface 36, a landing 46, and a reset member 64. The link control assembly 32 may be carried and/or defined by one or both of the first and second hood links 18, 20. The specific implementation shown in the drawings is just one possible example of many. In this example, the reset member is carried by the second link 20 and arranged to engage certain features formed on or carried by the first link 18. In one of many possible alternate examples, the arrangement could be reversed where the reset member is instead carried by the first link 18.

In the example shown, the return block 34 may be carried by the first link 18, such as on its sidewall 30. The return block 34 may be a surface or other structure extending outwardly from the sidewall 30, and in at least one implementation, may be defined on a bent flange 40 formed from the same piece of material as the rest of the sidewall 30. The flange 40 may include a retaining surface 42 laterally (e.g. axially—relative to the axis 24) spaced from the sidewall 30. The retaining surface 42 may extend generally radially (relative to axis 24) which is in the direction of movement of the first link 18 relative to the reset member 64 when the hinge assembly moves to its deployed position in the illustrated implementation. Of course, the return block 34 need not be integrally formed with any portion of the first link 18 and could be a separate component if desired.

The stop surface 36 may be longitudinally spaced from the return block 34 and the overjump 38 may be defined between the return block 34 and stop surface 36. The stop surface 36 may be defined at least in part by a second flange 44 bent from or otherwise carried by the sidewall 30. The second flange 44 may extend laterally from the sidewall 30, in the same general direction as the first flange 40 (e.g. axially), such that the return block 34 and stop surface 36 are generally oppositely facing or confronting surfaces on opposite sides of the overjump 38, and define a width of the overjump. A landing 46 may be defined by the second flange 44 on the opposite side of the overjump 38 as the retaining surface 42. The landing 46 may extend generally in the same direction as the retaining surface 42, and may be angled or tapered, if desired. The landing may be axially offset, e.g. out of plane or not in the same plane as the retaining surface 42, where at least a portion of the retaining surface can be viewed as being in an imaginary plane 47 (FIG. 6) and the return block 34 may extend further laterally (e.g. axially) outwardly than the landing 46.

Figure 5:
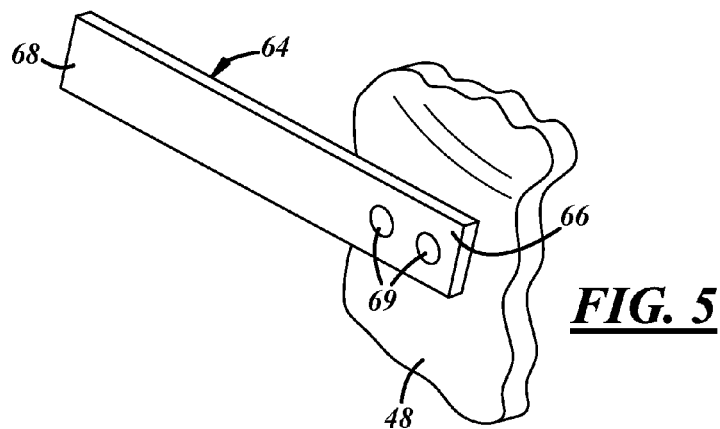
FIG. 5 is an enlarged fragmentary perspective view showing a reset member.

The reset member 64 may be a flexible and resilient member fixed against rotation at its first end 66 so that the first end remains stationary in use. In one implementation, the reset member 64 is cantilevered with its first end 66 fixed to the second link 20, such as in the area of the mounting flange 50, and its second end 68 is free so that it may move relative to the first end 66 (e.g. when the reset member 64 is bent). The first end 66 may be fixed by a pair of spaced apart connectors (e.g. rivets 69) to hold the reset member 64 stationary on the second link 20. Of course, the reset member 64 could be carried by an adjacent vehicle structure (i.e. other than the second link 20) such that the first link 18 moves relative to the reset member 64 when the hinge assembly is deployed. The reset member 64 may be formed of any suitable material, such as spring steel and may be a flat, rectangular, unitary body (as best shown in FIG. 5) or it may be bent or contoured in any desired manner. The second end 68 may be laterally offset from at least part of the landing 46 and the retaining surface 42 so that a portion of the reset member 64 bends or flexes when the retaining surface 42 or landing 46 are overlapped with a portion of the reset member 64. In at least some forms, the reset member 64 may have a width that is sized to be relatively closely received in the overjump 38 between the first and second stop surfaces 34, 36 (where return block 34 defines a first stop surface in this implementation).

FIGS. 1, 2 and 7 illustrate the hinge assembly's normal design position. This is the position in which the hinge assembly 10 remains during normal use of the vehicle. In this design position, the hood 12 may be closed and secured to the vehicle so that the hood does not move during operation of the vehicle, and the hood may be opened to permit access to things beneath the hood. The first and second links 18, 20 are connected together and they pivot in unison about the first pivot 22 when the hood 12 is opened or closed.

Figure 16:
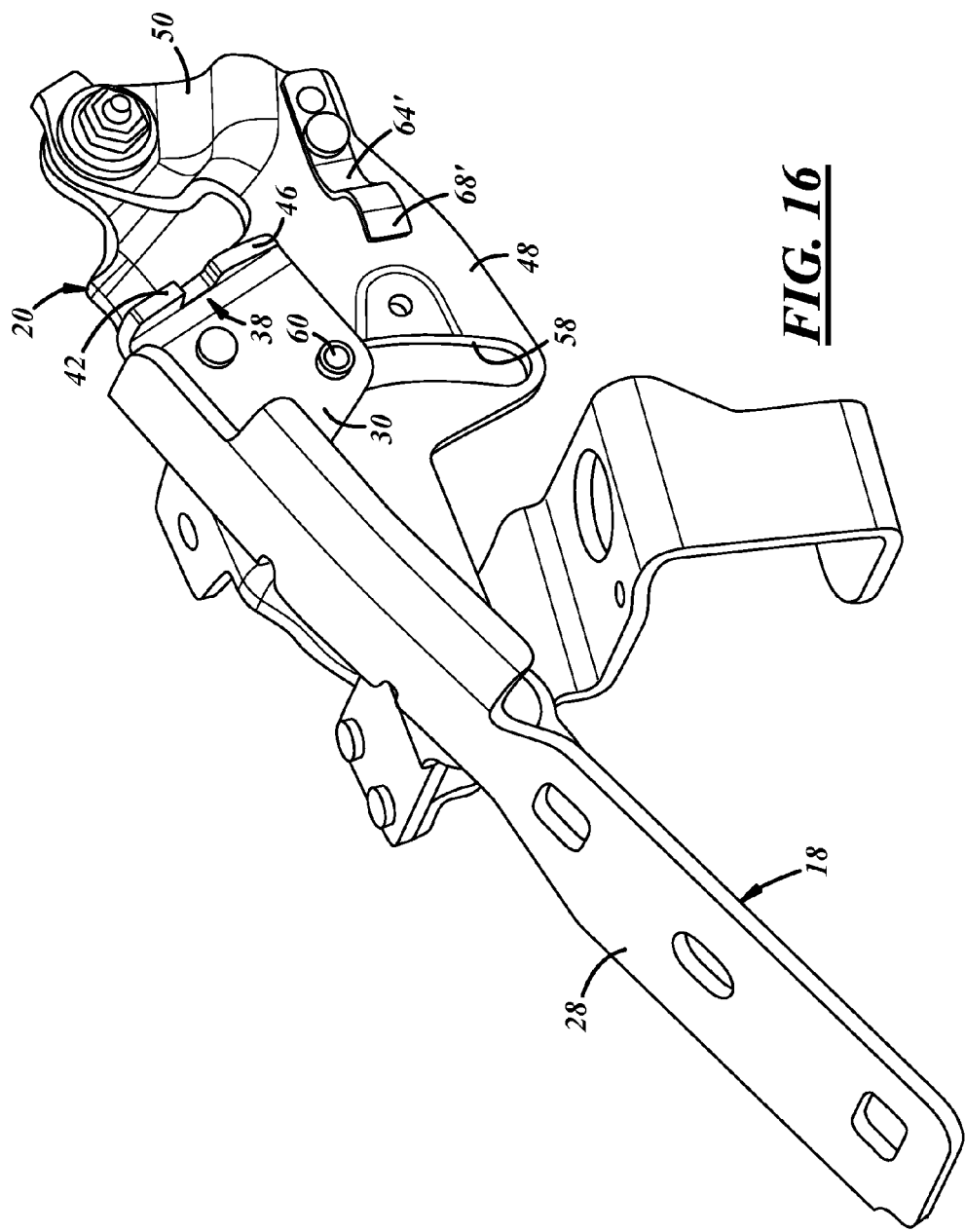
FIG. 16 is a perspective view of a hinge assembly including a bent reset member, shown in the deployed position.

FIGS. 3 and 8 illustrate the hinge assembly 10 in its deployed position which is the position to which the hinge assembly 10 is moved when the actuator 14 releases/breaks the releasable connector 52. To reach the deployed position, the first link 18 pivots relative to the second link 20 about the second pivot 16, generally in the direction of the arrow 70 in FIG. 3. During this movement, the connector 60 of the moveable coupling 56 travels within its slot 58 and the pivoted movement of the first link 18 is limited by engagement of the connector 60 with an end of its slot 58 as generally shown in FIG. 3. Also during this movement, the first link 18 is moved relative to the reset member 64 such that the second end 68 of the reset member 64 is no longer idle and engaged with the retaining surface 42 and is now located adjacent to the landing 46. In one implementation, the landing 46 has a longitudinal length such that the reset member 64 remains engaged with the landing 46 in the fully deployed position of the hinge. In another implementation, as shown in FIG. 16, a reset member 64' is bent between its ends and the reset member 64' does not remain engaged with the landing 46 when the hinge assembly 10 is in its deployed position. The bend in the reset member 64' maintains the second end 68' laterally spaced from the sidewall 48 of the second link 20 so that upon return movement of the first link 18 toward its design position, a tapered end of the landing 46 can slide beneath the reset member 64'.

In the deployed position, the pivoting of the first link 18 relative to the second link 20 raises a portion of the hood 12 from its normal operating position. As previously noted, this may be done in advance of or during a vehicle collision to move the hood 12 away from rigid engine components and/or vehicle components that may be damaged if severely impinged upon by the hood. In the deployed position, the first link 18 may pivot relative to the second link 20 thereby permitting some movement of the hood 12 which may improve energy absorption by the hood during the vehicle collision. After the collision, it may be desirable to lower the raised portion of the hood 12 and secure the hood against movement for subsequent movement of the vehicle. However, because the hood 12 may be bent or damaged, or components beneath the hood may have been moved or bent, it generally is not desirable to permit the hood to fully return to its design position. Doing so may damage hoses, belts or other components. To lessen the likelihood that such components may be damaged but also permit the hood to be secured, the hinge assembly 10 and the hood 12 may be moved to a reset position. Even if no impact with the hood 12 occurred, and even if the hinge assembly was moved to its deployed position in error, only allowing the hood to return to the reset position provides a visual indication that the hood release was deployed. And after deployment, the connector 52 needs to be replaced and the hinge assembly returned to the design position.

The reset position of the hinge assembly 10 is shown in FIGS. 4 and 10. The reset position is between the design and deployed positions, which means that the first link 18 is pivoted relative to the second link 20 in the reset position but not as far as it is in the deployed position. In the implementation shown in FIGS. 1-10, the reset position is defined by engagement of the reset member 64 with the return block 34, and in this position, the reset member 64 may be received within the overjump 38 and trapped between the return block 34 and stop surface 36. Movement of the first link 18 relative to the reset member 64 is shown in FIG. 9 where the deployed position of the reset member 64 is shown in dashed lines and the direction of movement of the first link is shown by the arrow 74. As shown in FIG. 9, this movement moves the landing 46 past the reset member 64 which laterally displaces the reset member 64 due to the tapered and laterally outward extending arrangement of the landing 46. But the landing 46 is not located laterally outwardly of the return block 34, in this implementation. Therefore, as shown in FIG. 9, the reset member 64 engages the return block 34 as the hood 12, and thereby the first link 18, is moved to the reset position. This limits movements of the first link 18 relative to the second link 20 toward the design position.

The lateral flexing of the reset member 64 from its initial position (FIG. 7) to its deployed position (FIG. 8) and back toward the design position (FIG. 9) is within the elastic limits of the material from which the reset member 64 is formed. Therefore, the resilient nature of the reset member 64 causes it to unbend when the reset member 64 is clear of the landing 46 and to thereby enter the overjump 38, as shown in FIG. 10. With the reset member 64 received within the overjump 38, movement of the first link 18 relative to the second link 20 in either direction (e.g. toward or further away from the design position) is resisted or prevented by engagement of the reset member 64 with the return block 34 and stop surface 36 (i.e. the reset member is overlapped in the direction of movement by the return block and stop surface). This secures the hood 12 and hinge assembly 10 in the reset position and resists or prevents relative movement between the first and second links 18, 20.

Thereafter, the hinge assembly 10 may be replaced or repaired so that the hinge assembly can be placed again in its design position. To do this, the reset member 64 is removed (e.g. manually flexed or bent) from the overjump 38, the first link 18 is pivoted relative to the second link 20 back to the design position so that the reset member 64 is engaged by the retaining surface 42, and the releasable connector 52 is reconnected to secure the first link 18 to the second link 20. In implementations using a shear pin 54 or other frangible connector, a new connector can be provided.

As noted above, the reset member 64 moves from its location in the design position (FIG. 7) to its location in the deployed position (FIG. 8) without entering the overjump 38. In the implementation shown, this is accomplished by one or more features of the hinge assembly 10. For example, the width W of an entrance to the overjump 38 may be close in size to the width of the reset member 64 so that relatively little movement of the first link 18 is needed to ensure that the entrance to the overjump 38 is not fully aligned or registered with the reset member 64.

The retaining surface 42 may also be laterally offset from the first end 66 of the reset member 64 further than the landing 46, as shown by distance X on FIG. 7. This offset can be large enough to ensure that the overjump 38 is moved out of registry with the reset member 64, after the retaining surface 42 is moved away from the reset member 64, sufficiently faster than the reset member 64 moves toward its unflexed state. In this way, the landing 46 is moved into alignment with at least a portion of the reset member 64 to prevent the reset member 64 from entering the overjump 38. That is, the landing 46 is sufficient out of plane or offset from the retaining surface so that the reset member 64 does not enter the overjump 38 as the hinge assembly moves from its design position to its deployed position. The spring rate of the reset member 64 and the velocity of the first link 18 when moving to its deployed position can be determined and a suitable offset or out of plane distance X provided to ensure that the reset member 64 does not enter the overjump 38 during deployment of the hinge assembly 10. In at least some implementations, the overjump is no more than the time and distance it takes for the reset member to collapse upon the offset landing while at the same time clearing the overjump.

The offset may also be set as a function of the size of the overjump entrance W relative to the size of the corresponding portion of the reset member 64. If the reset member 64 and overjump entrance are close in size, then very little movement of the first link 18 will be needed from the time the reset member 64 clears the retaining surface 42 until the stop surface 36 passes the lower edge of the reset member 64 thereby preventing the reset member 64 from entering the overjump 38 during deployment of the hinge assembly 10.

Another implementation of a hinge assembly 100 is shown in FIGS. 11-15. The first and second links 102, 104 may be coupled together in the same manner, and may be constructed as described above, if desired. In this implementation, the reset member 106 and the surfaces on the first link with which it is associated may be different. Accordingly, only these features will be described further herein.

Figure 13:
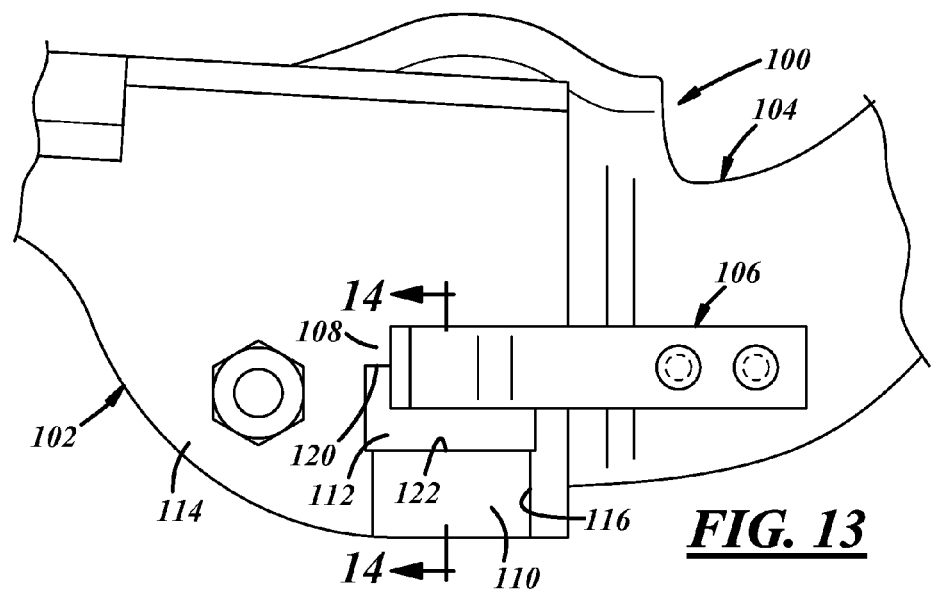
FIG. 13 is a fragmentary side view of a hinge assembly including the reset member of FIGS. 11 and 12 and shown in its design position.
Figure 14:
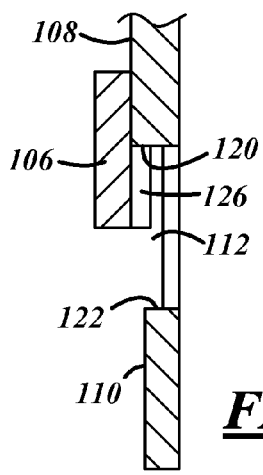
FIG. 14 is a fragmentary sectional view taken generally along line 14-14 of FIG. 13.
Figure 15:
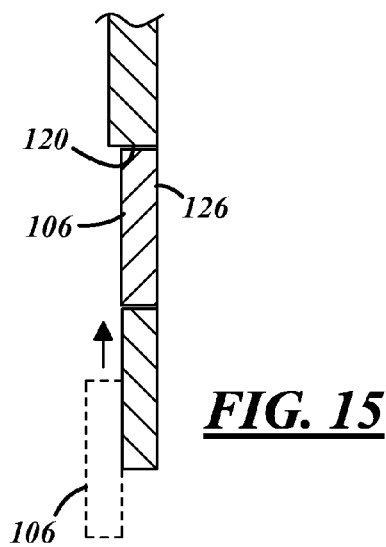
FIG. 15 is a view like FIG. 14 showing the hinge assembly in its reset position.

As shown in FIGS. 13-15, the first link 102 may include a retaining surface 108, a landing 110 and an overjump 112. The retaining surface 108 may be a portion of the sidewall 114 of the first link 102 adjacent to the overjump 112, without any bent flange or the like. The overjump 112 may be a cavity formed part of the way through the sidewall 114, or as shown, an opening formed completely through the sidewall 114. The landing 110 may be defined by a portion of the sidewall 114 adjacent to the overjump 112, generally opposite to the retaining surface 108. The landing 110 may be defined in a slot 116 (FIG. 13) formed part of the way through the sidewall 114 instead of on a bent flange as in the above described embodiment, providing a surface that is laterally offset from and out of plane with respect to the retaining surface 108. As in the previously discussed embodiment, a return block 120 and stop surface 122 may be provided on opposite sides of the overjump 112, and generally contiguous with the retaining surface 108 and landing 110.

Figure 11:
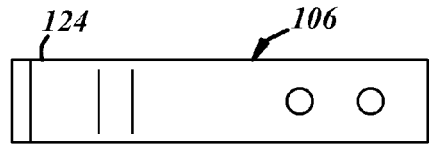
FIG. 11 is a plan view of a reset member.
Figure 12:
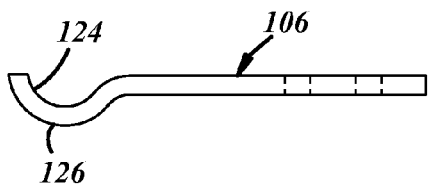
FIG. 12 is a side view of the reset member of FIG. 11.

As shown in FIGS. 11-13, the reset member 106 may have a bent or hook-shaped second end 124 providing a greater laterally extending surface area adapted to engage the return block 120 and stop surface 122 in a reset position of the hinge assembly 100. As best shown in FIGS. 13 and 14, in the design position of the hinge assembly 100, a rear surface 126 of the reset member 106, in the area of the hook, is engaged with the retaining surface 108. When the first link 102 is moved to its deployed position, the reset member 106 is in the location shown in hidden lines in FIG. 15. In this position, the reset member 106 is longitudinally spaced from the overjump 112 and may be engaged with the landing 110. When the first link 102 is moved to place the hinge assembly 100 in its reset position, the reset member 106 slides against the landing 110 until the landing clears the reset member 106 and the reset member 106 engages the return block 120 and the resiliency of the reset member 106 causes it to enter the overjump 112. With a through opening as the overjump 112, the hooked end 124 may extend fully into the overjump and its rear surface 126 may even extend outwardly beyond the sidewall 114 through the opening 112. This provides a secure retention of the hinge assembly 100 in the reset position and greatly inhibits or prevents movement of the first link 102 relative to the second link 104 until the reset member 106 is manually or otherwise intentionally removed from the overjump 112, such as by a service technician.

Hence, in at least some forms, a releasable hood hinge assembly 10, 100 is provided that includes a first link 18, 102, a second link 20, 104 and a reset 32 (the reset may be the same as or analogous to the previously described link control assembly). The second link 20, 104 may have a first pivot 16 about which the second link 20, 104 pivots in relation to the first link 18, 102. The first and second links are unified by a releasable connector (e.g. 52) in normal operation and unlocked in a crash operation to move relative to one another. The reset 32 having a reset member 64, 106, a return block 34, 120, an overjump 38, 112 and a landing 46, 110 offset from the return block and the return block having a positive stop. The reset having a pre-crash condition (e.g. the position of the reset when the hinge assembly 10, 100 is in its design position), a post-crash deployed condition (e.g. the position of the reset when the hinge assembly 10, 100 is in its deployed position) and a post-crash operating condition (e.g. the position of the reset after the hinge assembly is moved to its reset position as described above). The reset member is idle in the pre-crash condition, engages the landing in the post-crash condition and engages the positive stop in the post-crash operating condition.

Additionally, in at least some implementations, the reset member may engage a stop surface or second positive stop in the post-crash operating condition to inhibit movement of the reset member away from the positive stop of the return block. Further, in at least some implementations, the landing may be offset in two dimensions from at least part of the return block.

A first dimension may be in the direction of the span of the overjump between the return block and landing (which may be in the plane of the direction of pivoted movement of the second link relative to the first link), and a second dimension may be in a different direction.

While described above with regard to a "crash", the hinge assembly may be deployed without any vehicle crash occurring. Therefore, reference to "crash" may also refer to any deployment of the hinge assembly whether or not a vehicle crash actually occurs. In this way, the "pre-crash condition" can also be considered as a "pre-deployment condition", the "post-crash operating condition" can also be considered as a "post-deployment operating condition," and the "post-crash deployed condition" can be considered a "post-deployment condition."

While the forms of the invention herein disclosed constitute presently preferred embodiments, many others are possible. It is not intended herein to mention all the possible equivalent forms or ramifications of the invention. For example, while the reset member 64, 106 was described as being connected to the second link 20, 104 it could instead be carried by a different component such as the first link 18, 102 or an adjacent vehicle component other than the links. When coupled to the first link 18, 102, the retaining surface 42, 108, landing 46, 110, return block 34, 36, stop surface 120, 122 and overjump 38, 112 may all be formed on or carried by the second link 20, 104, or a different vehicle component. In this manner, those features may be stationary in use and the reset member 64, 106 may move with the first link 18, 102 and relative to those features. The general principles of operation would be the same and readily understood in view of the teachings herein such that a complete description of these alternate arrangements is not necessary. Further, it is understood that the terms used herein are merely descriptive, rather than limiting, and that various changes may be made without departing from the spirit or scope of the invention.

The invention claimed is:

1. A releasable hood hinge assembly, comprising:
a first link adapted to be connected to a vehicle hood;
a second link releasably coupled to the first link;
a releasable connector having a connected state in which it connects together the first and second links and defines a design position of the hinge assembly and a released state wherein relative movement is permitted between the first and second links to define a deployed position and a reset position of the hinge assembly;
a link control assembly having a reset member, a return block selectively engageable by the reset member, a landing and an overjump defined between the return block and the landing, where the landing is offset from the return block in two dimensions and where one dimension is in the direction of movement of the first link from the design position to the deployed position and the other dimension is different from said direction of movement so that when the hinge assembly moves from its design position to its deployed position the reset member is moved to the landing and when the hinge assembly is moved back toward the design position, the reset member is blocked from moving back to the design position.

2. The assembly of claim 1 wherein the reset member is connected to the second link and the first link moves relative to the reset member when the releasable connector is in its released state.

3. The assembly of claim 1 wherein a portion of the return block is in the same plane as the landing and an outer surface of the return block is not in the same plane as the landing.

4. The assembly of claim 3 wherein the overjump includes a gap defined between the return block and the landing.

5. The assembly of claim 4 wherein the overjump is defined at least in part by a stop surface that is adjacent to the landing, and when the hinge assembly is in its reset position, the reset member is overlapped with the stop surface in the direction of movement to inhibit movement of the hinge assembly away from the reset position in a direction toward the deployed position.

6. The assembly of claim 1 wherein the reset member is cantilevered to the second link or the first link.

7. The assembly of claim 1 which also includes a retaining surface extending from the return block and a stop surface extending from the landing, where the retaining surface is out of plane from the landing and a portion of the return block is positioned laterally outwardly of the stop surface and landing.

8. The assembly of claim 3 wherein the overjump includes an entrance portion that has a width that is no more than 15% greater than the width of a corresponding portion of the reset member.

9. A releasable hood hinge assembly, comprising:
a first link adapted to be connected to a vehicle hood;
a second link having a first pivot about which the second link pivots in use;
a releasable connector having a connected state in which the releasable connector connects together the first and second links and defines a design position of the hinge assembly and a released state wherein relative movement is permitted between the first and second links to define a deployed position and a reset position of the hinge assembly, where the reset position is between the design and deployed positions;
a return block; and
a reset member defined by a cantilevered, flexible and resilient body fixed at one end and having a portion that is laterally bendable and selectively engageable with the return block upon resilient return of the reset member toward its unbent state so that the reset member engages the return block when the hinge assembly is in its reset position and when the reset member is engaged with the return block, movement of the first link relative to the second link toward the design position is inhibited to retain the hinge assembly in its reset position.

10. The assembly of claim 9 which also includes a positive stop spaced from and confronting the return block and an overjump defined between the positive stop and the return block, wherein the reset member is disposed within the overjump in the reset position of the hinge assembly and engageable with the return block in one direction of relative movement between the first link and second link and engageable with the positive stop in a direction of relative movement between the first link and second link that is opposite said one direction of movement.

11. A releasable hood hinge assembly, comprising:
a first link;
a second link having a first pivot about which the second link pivots in relation to the first link; the first and second links unified by a releasable connector in normal operation and unlocked in a crash operation to move relative to one another; and
a reset having a pre-crash condition, a post-crash deployed condition and a post-crash operating condition, the reset having a reset member, a return block, an overjump and a landing offset from the return block, the return block having a positive stop, wherein the reset member is idle in the pre-crash condition, engages the landing and is blocked by the positive stop from returning to the pre-crash condition in the post-crash operating condition;
wherein the first link pivots relative to the second link in a crash operation and one of the overjump and the reset member is carried by the first link for movement with the first link and relative to the other of the overjump and the reset member, and wherein the landing is offset from the return block in a direction not parallel to the direction of movement of the first link so that the reset member does not engage the return block when the reset is moved from its pre-crash condition to its post-crash deployed.

12. The assembly of claim 11 wherein the reset also includes a second positive stop and the reset member engages the second positive stop in the post-crash operating condition to inhibit movement of the reset member away from the positive stop of the return block.

* * * * *